Feb. 4, 1969  J. M. BENJAMIN  3,425,736
PNEUMATIC PROBE FOR HANDLING FLAT OBJECTS
Filed March 25, 1966  Sheet 1 of 2
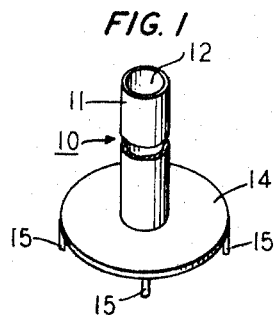
FIG. 1
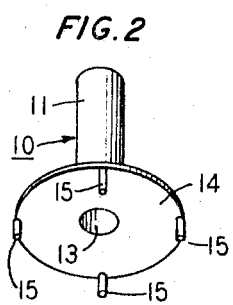
FIG. 2
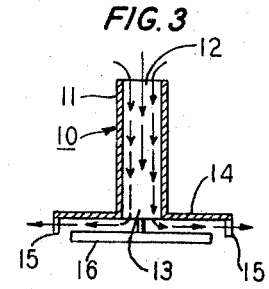
FIG. 3
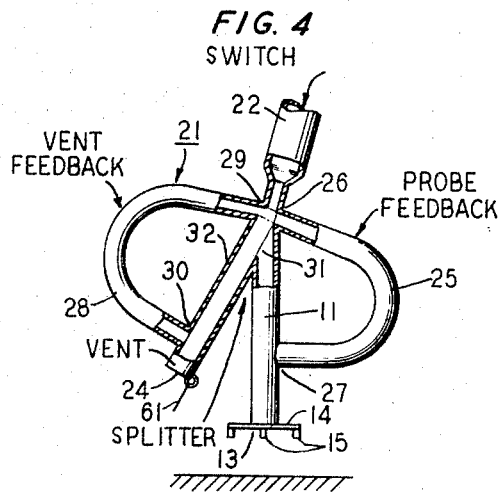
FIG. 4 SWITCH
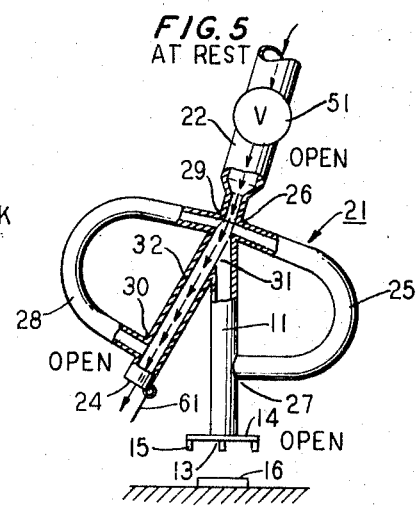
FIG. 5 AT REST
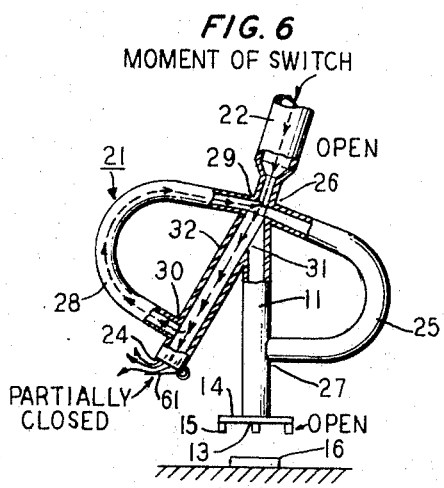
FIG. 6 MOMENT OF SWITCH
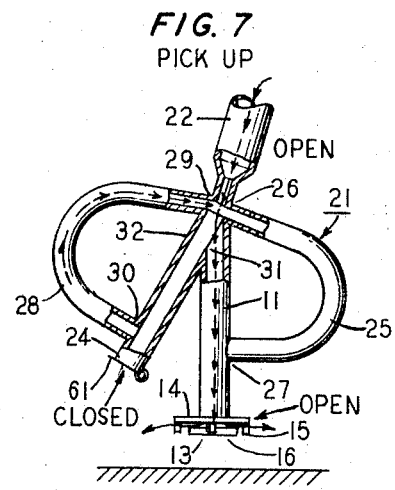
FIG. 7 PICK UP
INVENTOR
J. M. BENJAMIN
BY
*E. J. Olinder*
ATTORNEY

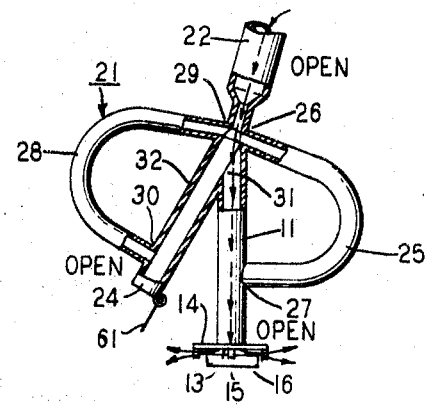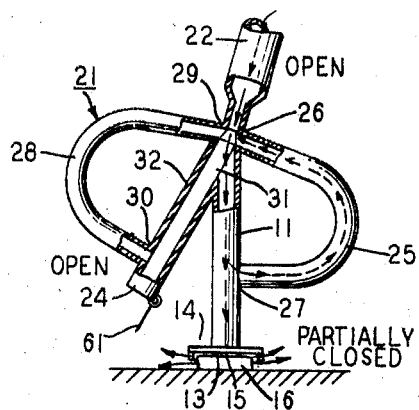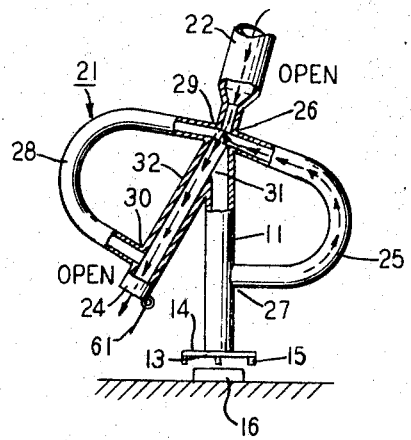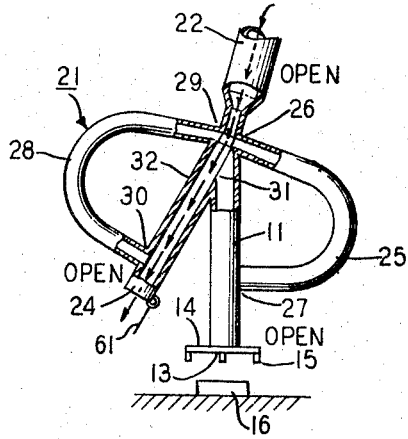

United States Patent Office
3,425,736
Patented Feb. 4, 1969

3,425,736
PNEUMATIC PROBE FOR HANDLING FLAT
OBJECTS
James M. Benjamin, Brick Town, N.J., assignor to Bell
Telephone Laboratories, Incorporated, New York, N.Y.,
a corporation of New York
Filed Mar. 25, 1966, Ser. No. 537,467
U.S. Cl. 294—64                              11 Claims
Int. Cl. B66f *19/00;* B66c *1/02*

This invention relates to devices for handling and positioning substantially flat objects and more particularly to devices of that type which are fluid operated.

In that portion of the electronics art that deals with integrated and thin film circuits and with miniaturized circuit components, it is well known that the full realization of commercial potential may be limited by the lack of adequate tools and equipment for physically handling the individual circuit blocks and elements. The requirements for such tools are severe; the objects involved must be handled and positioned with both accuracy and speed and the size of these objects may range from several square centimeters to a fraction of a square millimeter.

Tweezer-like devices, whether hand operated or automatically controlled, have not been shown to be satisfactory for the purposes indicated in that the extremely close mechanical tolerances required impose severe limitations on both the versatility and on the reliability of the tools. One potentially attractive approach to the problem involves the use of pneumatic probes that operate on a vacuum principle. Such probes, although useful in some applications, are not equipped with an automatic release feature, however, and, accordingly, when an object that has been picked up by the probe is to be released, some action must be taken by the operator to terminate the vacuum force. In taking such action it is evident that the probe may inadvertently be shifted in position by the operator before the object is released and consequently, positioning accuracy is lost. An additional disadvantage inherent in a vacuum operated probe is the tendency to pick up particles of foreign material that tend to clog the probe and render its operation less reliable. A further disadvantage inherent in a vacuum probe is the tendency of very small objects to stick to the probe even after the vacuum force has been terminated.

One object of the invention, therefore, is to improve pneumatic probes for the handling and positioning of small substantially flat objects.

A specific object is to simplify such probes.

A further object is to enhance the accuracy of the device positioning capabilities of such probes.

Within the past several years an entire field of technology has been developed dealing with the control of fluid-power systems by devices in which the fluid itself is the working medium, as contrasted with conventional electronic control of fluid-power systems. Devices that have been developed in this area include amplifiers, logic devices such as flip-flops, modulators and various types of transducers. A number of types of fluid sensors have also been developed that are capable of detecting the presence of external physical conditions or phenomena and are capable of converting such detection into a fluid signal in terms of a pressure difference or the like. Pure-fluid technology has been widely discussed in current technical literature as shown, for example, by an article "Pure Fluid" published in the June 24, 1965 issue of Machine Design, Penton Publishing Company.

The achievement of the objects of the invention and the principles thereof stem in part from the realization that certain of the techniques employed in the devices of pure-fluid technology may advantageously be turned to account in the construction of a pickup probe for handling substantially flat objects such as integrated circuit wafers and the like.

More specifically, in accordance with the invention, a flat object pickup and handling device is constructed in the form of a probe that utilizes a flanged duct. Means are provided for introducing an air-flow at one end of the duct. When the probe flange is placed parallel with and in close proximity to any flat object, a pressure differential is created, in accordance with Bernoulli's basic gas flow principle, so that a higher pressure is present on the underside of the object than on the side toward the probe and, accordingly, the object may be readily lifted and positioned by the probe. The object makes no physical contact with the probe, however, inasmuch as a cushion of air remains between the upper side of the object and the flange of the probe.

When the object has been moved to the desired location for positioning, the object need only be touched down at the desired position and, in accordance with the invention, release occurs automatically. No additional action is required of the operator. The automatic object-release aspect of the invention is made available through the operation of a probe feedback duct that, in effect, diverts the air from the main probe duct whenever the normally open or flange end of the probe is substantially blocked off. The probe is of course substantially blocked off whenever pressure is brought to bear on the underside of an object that is held by the probe. The stability of air-flow through a duct may be explained in terms of the "Coanda" effect, a phenomena fully discussed in the Machine Design article cited above. Briefly, the Coanda effect is a principle of fluid flow that explains the seeming adherence of a jet stream to a curved or slanted retaining surface once the stream has been directed to that surface.

In addition to the foregoing, one further advantage that is inherent in a pickup device in accordance with the invention is that many of the convenience features of a vacuum operated object-handling system are enjoyed but, at the same time, the ducts automatically expel foreign particles, rather than drawing them in, owing to the presence of positive pressure rather than vacuum pressure.

Accordingly, one feature of the invention is a pneumatically operated flat object pickup device utilizing a Bernoulli-type pressure differential rather than vacuum force.

Another feature of the invention is a pneumatically operated small object-handling device utilizing a flanged probe duct, a vent duct and a vent feedback duct.

Still another feature of the invention is a pneumatically operated pickup device that inherently eliminates the need to dislodge a held object to effect final release.

An additional feature of the invention is a pneumatically operated pickup device that inherently eliminates operational interference from foreign matter, stray particles of dirt and the like.

A further feature is an automatic release arrangement whereby the holding force of the tool is abruptly terminated as soon as the held object is touched down at the desired new location.

The principles of the invention as well as additional objects and features thereof will be fully apprehended from the following detailed description of an illustrative embodiment and from the drawing in which:

FIG. 1 is a sketch of a pneumatically operated probe in accordance with the invention, shown in perspective from above;

FIG. 2 is a sketch of the probe of FIG. 1 presented in a bottom perspective view;

FIG. 3 is a sketch of the probe of FIGS. 1 and 2 shown in operation in cross section;

FIG. 4 is a sketch of a complete device in accordance with the invention comprising a combination probe and bistable pneumatic switch;

FIG. 5 is a sketch of the device of FIG. 4 shown in the "at rest" condition with air-flow through the vent duct;

FIG. 6 is a sketch of the device of FIG. 4 shown at the moment of air-flow switch;

FIG. 7 is a sketch of the device of FIG. 4 shown at the moment of object pickup;

FIG. 8 is a sketch of the device of FIG. 4 shown during the holding and transport mode with air-flow through the probe only;

FIG. 9 is a sketch of the device of FIG. 4 shown at the moment of air-flow switch with air-flow shown in the probe feedback duct;

FIG. 10 is a sketch of the device of FIG. 4 illustrating the moment at which the object is positioned; and FIG. 11 is a sketch of the device of FIG. 4 shown in the "at rest" condition after the transported object has been released.

The basic principles of the invention, insofar as they relate to the pneumatic creation of a force for picking up small flat objects, may best be understood from FIGS. 1, 2 and 3. As shown in FIG. 1, a probe device 10 in accordance with the invention consists simply of a tube 11 having an input orifice 12 and an output orifice 13. The output orifice is surrounded by a flange 14, a flat disc-like collar member which is disposed substantially at right angles to the duct 11. A plurality of stabilizing fingers 15 is disposed about the periphery of the flange 14, extending downwardly therefrom. Alternatively, selected irregular projections on the underside of the flange might be employed, depending upon the configuration of the object to be handled.

As shown in FIG. 3, the purpose of the fingers 15, or other similar projections, is to prevent a held object such as the flat object 16 from slipping away from the orifice 13. As FIG. 3 illustrates, pickup force for a flat object is created by introducing an air-flow into the duct 11 from the input orifice 12. When the flange 14 is placed in parallel juxtaposition to the flat object 16, the cross-sectional area provided for the escape of air on either side of the exit orifice 13 is less than the total cross-section area of the probe duct 11, and, in accordance with the well-known relationships between fluid flow and pressure as first enunciated by Bernoulli, the pressure in the channels between the flat object 16 and the flange 14 is lower than the pressure in the duct 11. Additionally, the pressure in the channels indicated is also lower than the pressure on the outside of the flat object 16. Consequently, so long as the air-flow is maintained in the duct 11, an object such as the flat object 16 will be held in what amounts to a floating condition under the control of the pressure differential indicated.

It is evident that in a device of the type disclosed in FIGS. 1, 2 and 3 a held object may readily be released by terminating the air-flow in the duct. To effect such a termination, however, obviously requires some action on the part of the operator. Specifically, the operator must turn a valve, throw a switch, place his finger over the air-flow entrance orifice or take some other similar positive step. Placing such a requirement on an operator is clearly undesirable inasmuch as the final positioning or placement of a transported object may require the greatest possible accuracy and a certain degree of accuracy is necessarily sacrificed if the operator is required to perform two simultaneous functions, i.e., placing the probe in the desired position and taking some manual action to terminate the air-flow in the probe. In accordance with the invention, the requirement for this latter action is avoided by the utilization of a combination probe and bistable pneumatic switch device as shown in FIG. 4.

A part of the structure of the device 21 of FIG. 4 is common to the probe structure shown in FIGS. 1, 2 and 3 in that it includes a probe duct 11 terminating in a flange member 14 and in an exit orifice 13. Additionally, however, an input or supply duct 22 extends upwardly from the probe duct 11. Viewed as a pneumatic bistable switch, one leg of the switch consists of the probe duct 11, a second leg of the switch is the vent duct 32 which is joined to the probe duct 11 in an angular or splitter connection 31, and a third leg of the switch is the input or supply duct 22. An additional air passage, the vent feedback duct 28, connects the exit end 24 of the vent duct 32 back to the input duct 22 at a junction point 29. Similarly, a probe feedback duct 25 extends from a junction point 27 on the probe duct 11 to a junction point 26 on the input duct 22. With the resulting configuration of air passages of the device 21 shown in FIG. 4, air flowing downwardly through the input duct 22 can be made to flow only through the probe duct 11 or only through the vent duct 32 and further, the air-flow will continue in a stable flow until switched to the opposite air passage by restricting that passage through which the air is flowing.

FIGS. 5 through 11 illustrate the steps involved in a complete operational sequence for the device shown in FIG. 4. With the device 21 at rest, as shown in FIG. 5, air introduced through a valve 51 into the input duct 22 is flowing through the vent duct 32 and out the exit end thereof 24. In this condition no pickup force is provided.

In FIG. 6 the device 21 is being positioned over a small flat object 16 and the vent opening 24 is being blocked off by a valve 61 so that air starts to divert into the vent feedback duct 28. This condition is aptly termed the "moment of switch," since the air is made to switch from the vent duct 32 across the splitter connection 31 and into the probe duct 11. The valve 61 may be operated manually or, alternatively, some suitable type of automatic or semi-automatic control may be employed. The phenomenon of fluid or air switching is commonly explained in terms of the Coanda effect wherein a jet of fluid once caused to adhere to an adjacent curve or inclined surface tends to retain its attachment to that surface. This effect is fully explained in the article in the magazine Machine Design cited above.

As the flow of air increases in duct 11, as shown in FIG. 7, a pressure differential develops, as explained above in connection with the discussion of FIG. 3, and the object 16 is picked up by the probe. As shown in FIG. 7, the vent 24 must be substantially restricted or closed until transport starts in order to prevent "switchback." Once the object 16 has been captured by the probe 21 it may then readily be transported to the desired point of deposit.

In accordance with the invention, the principle of fluid switching is once again turned to account when a held object is to be released by the probe. As shown in FIG. 9, the object 16 has been placed on the working surface and the probe 21 has been moved downwardly toward the object 16 to reduce the distance between the flange 14 and the top portion of the object 16. As a result, the flow of air in probe duct 11 has been substantially restricted. Consequently, air is diverted back through the probe feedback duct 25. At this time the stable flow of air is interrupted in the probe duct 11 and induced to follow a path through the vent duct 32. When this sequence has occurred, the pressure differential that initially held the object 16 in place is removed. It is to be noted that the placement of the object 16 and the release of the object from the holding force of the probe is accomplished simply by placing the object 16 in the desired location. No other action on the part of the operator is required.

As shown in FIG. 10, after the object has been placed, and provided the vent orifice 24 is open, air-flow is switched from the probe duct 11 and from the probe feedback duct 25 into the vent duct 32. The completion of this switching operation is illustrated in FIG. 11 which shows the device once again in its rest condition with air-flow restricted to the input duct 22 and to the vent duct 32.

It is to be understood that the embodiment described herein is merely illustrative of the principles of the invention. Modifications thereto may be effected by persons skilled in the art without departing from the spirit and scope of the invention.

What is claimed is:

1. A pneumatically powered probe for handling and positioning flat objects comprising, in combination, a probe duct having an input and an output end, a flange member surrounding said output end, means for directing an air-flow through said duct thereby to form an area reduced in pressure with respect to ambient pressure between said flange and any flat object placed in parallel relation and in relatively close proximity to said flange, whereby said object may be lifted by said ambient pressure, and means responsive to increased pressure on the underside of an object being lifted for terminating said air-flow in said duct, whereupon said object is automatically released by said probe.

2. Apparatus in accordance with claim 1 wherein said directing means includes a vent duct angularly disposed to said probe duct, one end thereof joining said main duct at a point relatively near to said input end, and a vent feedback duct for diverting air-flow from said vent duct, air-flow applied to said input end being directed through said vent duct when the free end of said vent duct is open and said output end of said probe duct is restricted.

3. Apparatus in accordance with claim 1 wherein said terminating means includes a probe feedback duct having one end thereof open to said probe duct at a point relatively near to said open end and the other end thereof open to said probe duct relatively near to said input end whereby air-flow in said main duct is automatically switched to said probe feedback duct.

4. Apparatus in accordance with claim 1 wherein the underside of said flange includes downwardly extending finger members to stabilize objects lifted by said probe.

5. A pneumatically powered probe for handling flat objects comprising, in combination, a first duct having an input end and a first output end, a second duct sharing said input end and having a separate output end, first means for introducing an air-stream into said second duct, second means for diverting said air-stream into said first duct, third means responsive to the passage of said air-stream through said first output end whenever said first output end is placed in close proximity to a relatively flat object for creating a pressure lower than ambient pressure whereby said object may be held in position and lifted by said ambient pressure, and fourth means responsive to touching said object down at a preselected position and moving said probe toward said object while said object is being held by said probe for terminating said air-stream whereby said object is automatically released by said probe.

6. Apparatus in accordance with claim 5 wherein said first means comprises a valve.

7. Apparatus in accordance with claim 5 wherein said second means comprises a means for closing off said separate output end.

8. Apparatus in accordance with claim 5 wherein said probe includes a flange positioned around said output end disposed substantially at right angles to said first duct.

9. Apparatus in accordance with claim 5 wherein said fourth means includes a probe duct feedback duct.

10. Apparatus in accordance with claim 8 wherein said flange supports downwardly extending finger members for stabilizing an object held by said probe.

11. A pneumatically operated pickup probe comprising a duct having an air-stream entrance end and an air-stream exit end, a flange member surrounding said exit end, said flange member being disposed substantially perpendicular to said duct, means for introducing said air-stream into said entrance end when said exit end is in relatively close proximity to a relatively small flat object to be transported, said flange being substantially parallel to said object, whereby a pressure reduced in magnitude with respect to ambient pressure is created on one side of said object and said object is held in place by said ambient pressure acting on the opposite side of said object as said probe is moved, and means responsive to a pressure greater than ambient pressure on the side of said object away from said probe for terminating said air stream at said exit end whereby said object is deposited by said probe at the point where said terminating of said air stream occurs.

References Cited

UNITED STATES PATENTS 3,220,723  11/1965  Rabinow _____ 294—64 X
3,223,443  12/1965  Misson _____ 294—64 X GERALD M. FORLENZA, *Primary Examiner.*

GEORGE F. ABRAHAM, *Assistant Examiner.*